Dec. 10, 1968        W. S. WARE ET AL        3,415,351
                       BAG ACCUMULATOR
Filed May 10, 1967                         9 Sheets-Sheet 1

INVENTORS
WALTER S. WARE
DONALD R. CANNON

BY

ATTORNEY

Dec. 10, 1968  W. S. WARE ET AL  3,415,351
BAG ACCUMULATOR

Filed May 10, 1967  9 Sheets-Sheet 2

FIG-2

INVENTORS:
WALTER S. WARE
DONALD R. CANNON

BY

ATTORNEY

Dec. 10, 1968 W. S. WARE ET AL 3,415,351
BAG ACCUMULATOR
Filed May 10, 1967 9 Sheets-Sheet 9

INVENTORS:
WALTER S. WARE
DONALD R. CANNON

BY

ATTORNEY

United States Patent Office 3,415,351
Patented Dec. 10, 1968

3,415,351
BAG ACCUMULATOR
Walter S. Ware and Donald R. Cannon, West Monroe, La., assignors to Olinkraft, Inc., a corporation of Delaware
Filed May 10, 1967, Ser. No. 637,388
8 Claims. (Cl. 198—33)

ABSTRACT OF THE DISCLOSURE

An apparatus and method for alternating or reversing the butts or bottoms of bag groups in preparation for baling to ensure relatively right rectangular bales.

An apparatus embracing certain principles of the invention may comprise a pair of spaced, phased, cooperating helices each having a plurality of turns with a pitch equal to or greater than the thickness of a predetermined number of bags defining a bag group, shaft means for supporting and rotating said helices in unison, means for continuously feeding bags from a source toward the upstream ends of the helices so that as the helices rotate, a bag group is intercepted periodically, clamp means projecting into and received within at least one of said helices from its downstream end, said clamp means being operable to engage, clamp and rotate a bag group effective to change the attitude or position of the group from a vertical position to a horizontal position in alternating fashion.

A method embracing certain principles of the invention may comprise the steps of arranging bags in groups by utilizing a pair of cooperating helices to intercept and advance a predetermined number of bags moving continuously from a source, mechanically grasping a bag group while being advanced by said helices, rotating said group and moving the group along a path generally parallel to the axes of said helices to prepare said group for baling.

Other features and advantages of the invention will become more apparent from a study of the succeeding specification and claims when read in conjunction with the appended drawings, in which:

Figure 1:
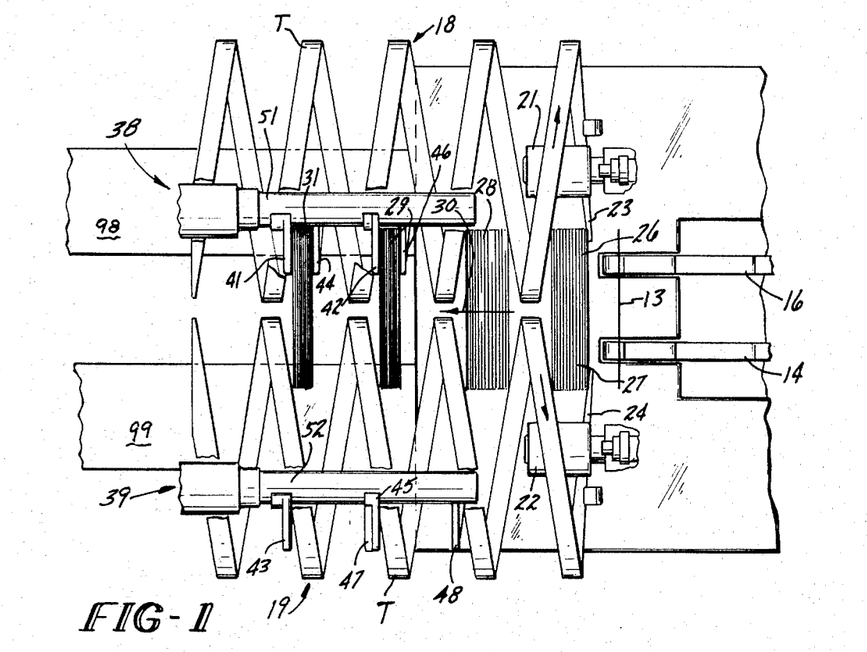
FIG. 1 is a plan view of a machine embodying the principles of the invention showing one set of clamp means in the normal position (open and clear of bag groups) and another set of clamp means straddling two bag groups in the closed position.
Figure 2:
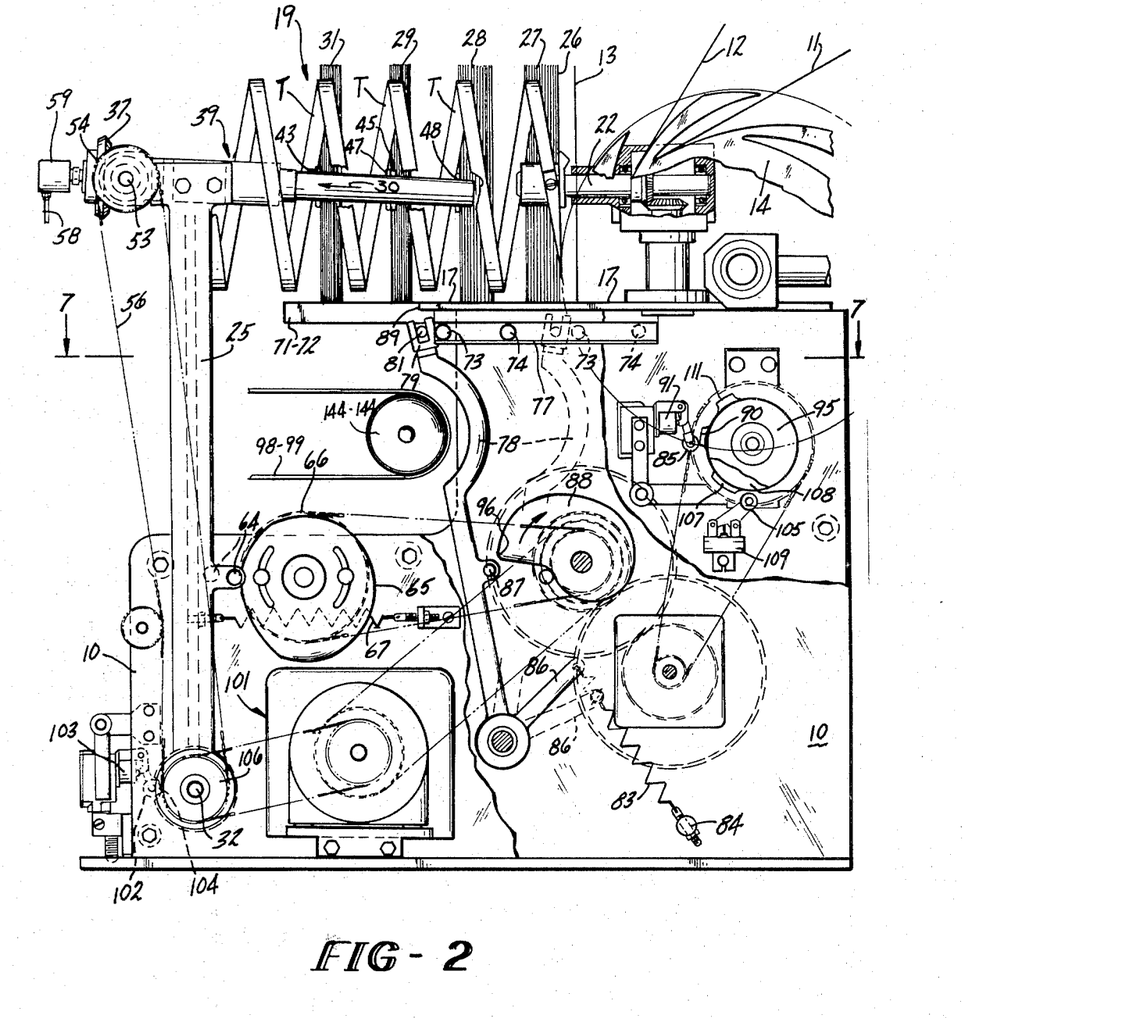
FIG. 2 is a side view of FIG. 2.
Figure 3:
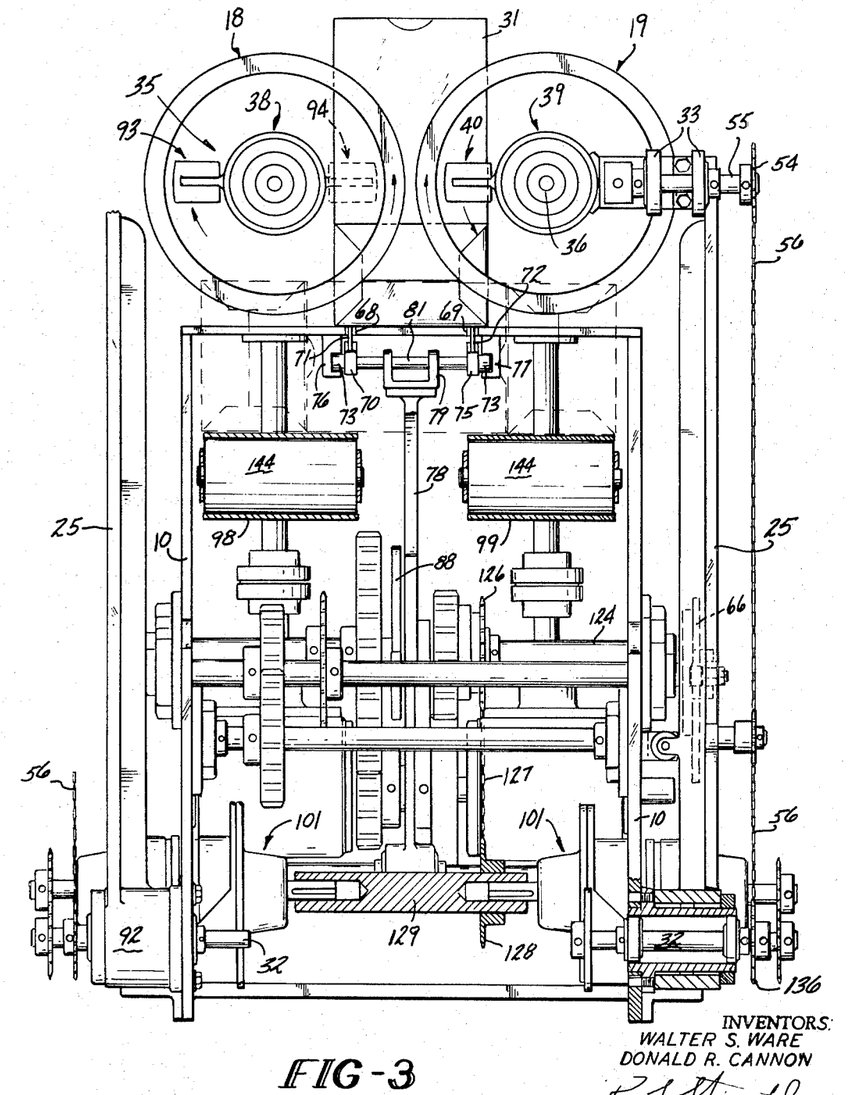
FIG. 3 is an elevational view of the left end of FIG. 1; in this view, the machine of FIG. 1 has been operated through one cycle so that the left clamp means is shown in the normal position and the right clamp means is shown operated and in contact with a bag group.

Referring now to the drawings and in particular to FIGS. 1, 2 and 3, a plurality of collapsed bags indicated generally by the reference numerals 11, 12 and 13 are supplied continuously from a bag maker (not shown) by pocketed feed whels 14 and 16.

The bags are received in a vertical position upon a rceiving member defining a flat plate 17.

Mounted over the receiving member are two spaced, phased, cooperating helices 18 and 19 supported and rotatably driven by stub shafts 21 and 22. The helices each have a plurality of turns T with a pitch equal to or greater than a thickness of a predetermined number of bags; in the present embodiment the pitch distance is selected to accommodate twenty-five bags defining a bag group.

The rotational speed with which the shafts 21 and 22 drive their mating helices is so selected and timed relative to the speed with which the pocketed feed wheels 14 and 16 supply bags to the plate 17 that the upstream ends or tips 23 and 24 of the helices periodically intercept or cut off a downstream bag (such as the bag 26 of FIGS. 1 and 2), from the next upstream bag 13 to define a bag group indicated by the reference numeral 27.

As stated previously, the pitch of the helices 18 and 19, their rotational speed, and timing relative to the feed wheels 14 and 16 is selected to develop bag groups containing twenty-five bags. The helices 18 and 19 make one revolution per twenty-five bags in the direction shown by the arrows of FIG. 3. Obviously, adjustments can be made in timing, speed and helix pitch to develop bag groups containing any desired number of bags.

After the cutoff or definition of bag group 27, this group and downstream groups 28, 29 and 31 are advanced along the plate 17, in the direction shown by the arrow labeled 30, by the continuous rotation of the helices. Individual bags in each group are disposed in a vertical position with the bag butts (bottoms) down and open ends up.

At the downstream end of each helix (left end as viewed in FIGS. 1 and 2) rotatable shafts 38 and 39 are supported by movable arms 25—25 (one arm 25 is shown in FIG. 2 and both arms are shown in FIG. 3); shaft 38 is partially received within helix 18 and shaft 39 is partially received within helix 19.

Each shaft carries a clamp means, indicated generally by the reference numerals 35 and 40 in FIG. 3, defining two cooperating pairs of fingers or lugs. Each pair of lugs comprises a fixed lug such as the lugs 41 and 42 secured to housing 51 and lugs 43 and 45 secured to housing 52 (FIGS. 1 and 2), and a movable lug such as lugs 44, 46, 47 and 48, carried by axially movable pistons 53—53 (see FIG. 6).

A typical pair of lugs is illustrated by the reference numerals 41 and 44 on shaft housing 51 in FIG. 1.

For convenience in subsequently claiming the invention, shaft 38 (or 39), its support arm 25, and corresponding pairs of lugs are referred to collectively as clamp means.

As will be explained in greater detail hereafter, each clamp means is movable from a first position in which it is free or clear of bag groups to a second position in which the clamp means straddles bag groups. For example, in FIG. 1 the clamp means including shaft 39 is in the first position and the clamp means including shaft 38 is in the second position.

Each clamp means is also movable from an open position to a closed position effective to clamp and hold bag groups. For example, in FIG. 1 the clamp means associated with shaft 39 is in the open position and the clamp means associated with shaft 38 is in the closed position.

Please note that except for opposite hand rotation, each clamp means is identical so that only one clamp means and its associated drive and support structure will be described in detail.

Referring in detail to FIGS. 1, 2, 3 and 6, arm 25, pivotally mounted to frame 10 at 32, carries a bracket 33 supporting a sleeve 34 serving as a bearing for stub shaft 36. The stub shaft 36 carries housing 52 at one end and bevel gear 37 at the opposite end. The gear 37 makes a driving connection with mating bevel gear 49 in turn driven by shaft 55 through sprocket 54 and roller chain 56.

Figure 6:
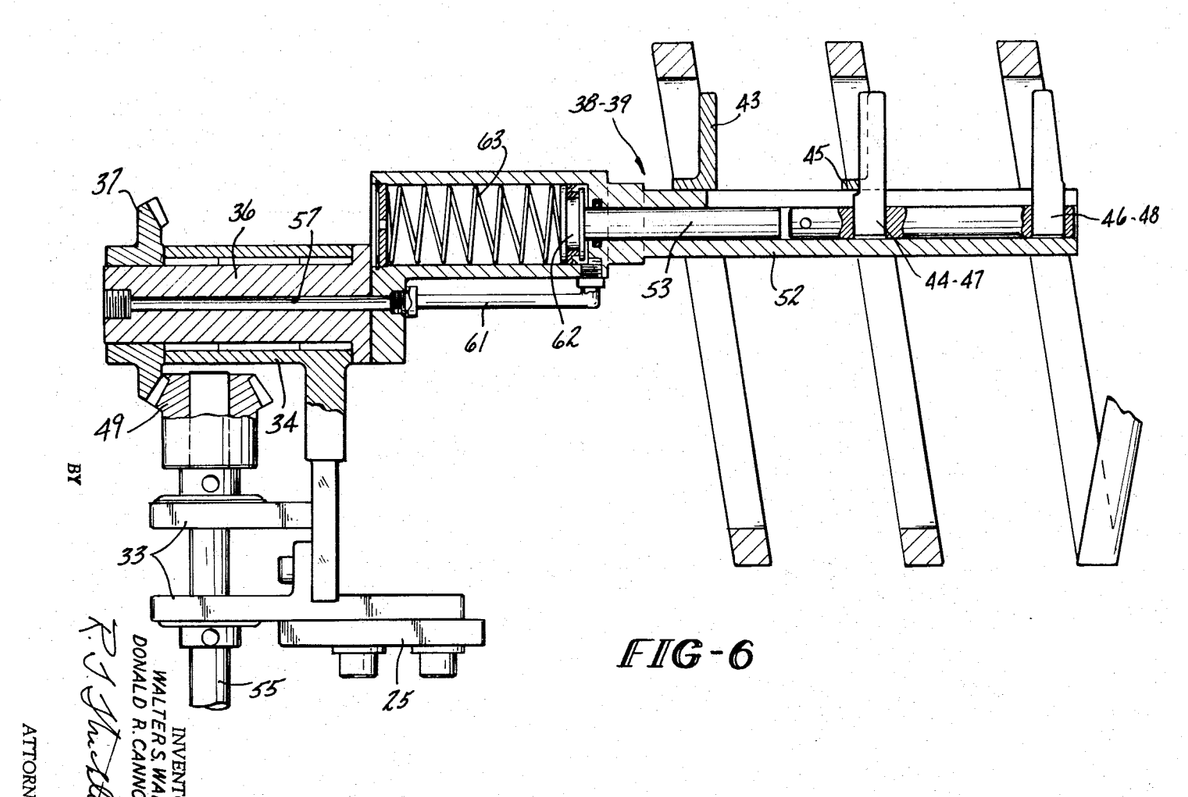
FIG. 6 is a sectional view of a helix and its cooperating clamp means and supporting shaft with certain portions thereof in section for clarity.

Stub shaft 36 is formed with a bore 57 providing a conduit for air under pressure supplied through tube 58, rotatory joint 59 and tube 61 to piston head 62 operative to drive piston 53 to the left, as viewed in FIG. 6, against spring 63 effective to move lugs 47 and 48 from the open position to the closed position.

For a reason that will be explained hereinafter, each shaft 38–39 is movable axially relative to its mating helix in that arm 25 carries a follower 64 held into contact with continuously rotating cam 66 by coil spring 67. The cam is operative to move the arm 25 and shaft 39 about pivot 32, to and fro, through an arc from a position corresponding to the solid line illustration of follower 64 to the dotted line illustration of the follower.

Figure 5:
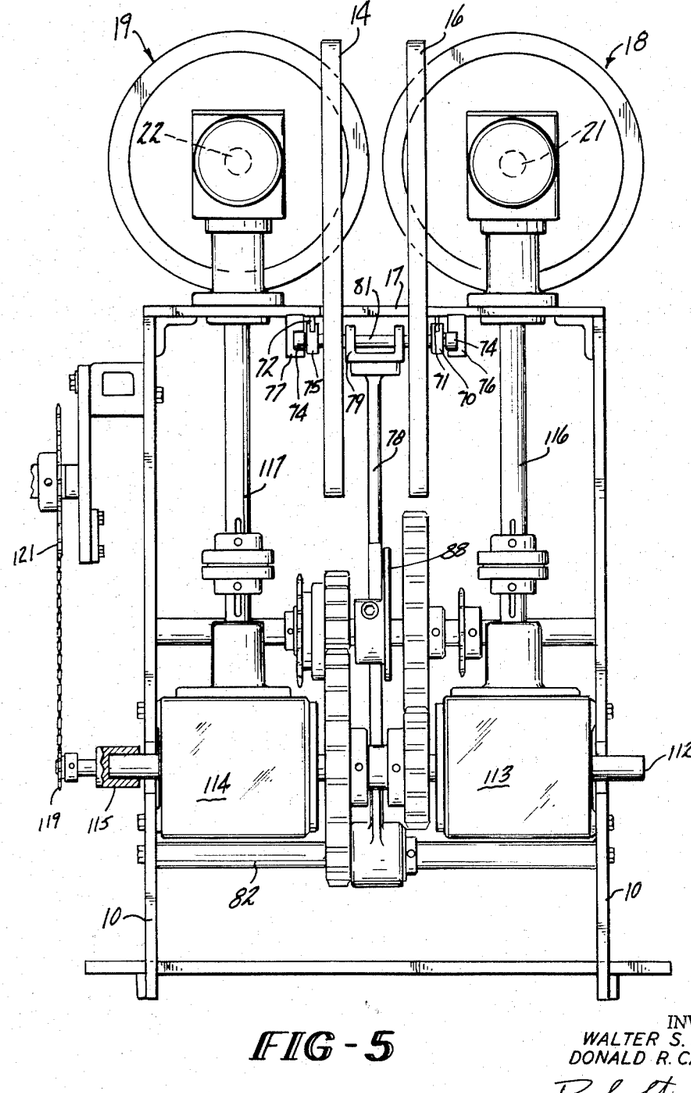
FIG. 5 is an elevational view of the right end of FIG. 1.

Referring to FIGS. 2, 3 and 5, note that flat plate 17 is provided with two elongated through slots 68–69 providing clearance for mating reciprocating rails 71 and 72.

The tops of the rails 71–72 are flush with the top surface of the plate 17 and in the extended position shown in FIG. 2, provide an extension of the plate 17.

The rails, supported by carriage bars 70–75 and guided by rollers 73–74 in cooperation with tracks 76–77 suspended from the bottom side of the plate 17, are cast from the extended position to the retracted position (see dotted line position of rollers 73–74 in FIG. 2) by crank arm 78 whose bifurcated end 79 engages carriage rod 81.

Crank arm 78, pivotally supported on rod 82 (FIG. 5), in turn supported by frame 10, is urged in a clockwise direction (to a retracted position) by coil spring 83 connected at one end to the frame as at 84 and at the opposite end to crank finger 86. Arm 78 is driven in a counterclockwise direction (to an extended position) by the cooperation between arm follower 87 and cam 88. Cam 88 rotates constantly in the direction shown.

The rails 71–72 are advanced gradually and in cyclic fashion, from their retracted position to their extended position at a linear speed corresponding to the linear advance of the bag groups being conveyed downstream by the constantly rotating helices 18 and 19 to provide support for the downstream bag groups 29 and 31 as shown in FIG. 2.

When the rails 71–72 are fully extended and the downstream bag groups, such as groups 29 and 31, are clear of the end 89 of plate 17 (as in FIG. 2), micro switch 91 is actuated when start follower 85 encounters lobe 90 on continuously rotating cam 95 energizing the magnetic clutch of magnetic clutch-brake unit 101 to apply power to roller chain 56 to rotate shaft 38 (or shaft 39) from its first position (position 93 in FIGS. 3 and 4) to its second position (position 94) so that the lugs on shaft 38 make entry between bag groups 29 and 31.

Upon arrival at the second position, rotation of shaft 38 is stopped and held in that stop follower 102 of micro switch 103 encounters recess 104 in intermittently rotating cam 106.

Figure 4:
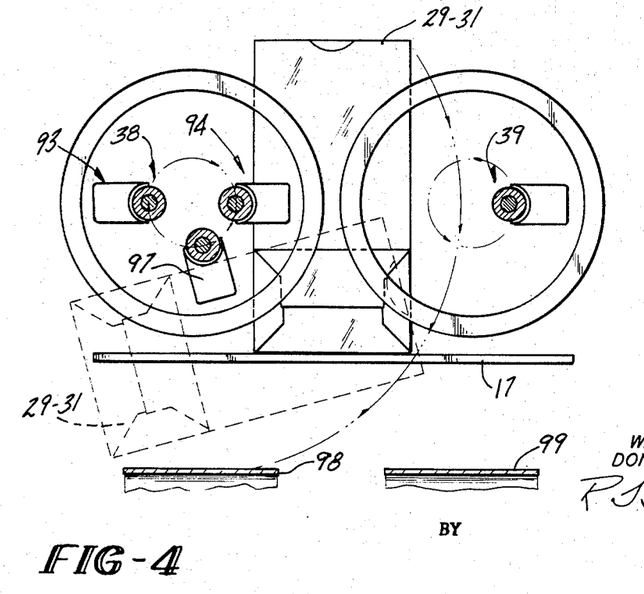
FIG. 4 is a schematic view of the left end of FIG. 1 showing the operated or closed (left) clamp means of FIG. 1 in the course of turning bag groups from a vertical position to a horizontal position.

Micro switch 103 de-energizes the magnetic clutch and energizes the magnetic brake of unit 101 to hold shaft 38 in the second position (position 94 of FIG. 4).

While the shaft 38 is held in the second position, lobe 107 of cam 108 encounters air valve follower 105 and operates air valve 109 to introduce air under pressure through conduit 58, and rotating joint 59 (see FIG. 2) to drive piston 53 (see FIG. 6) and corresponding lugs 44 and 46 into a clamping position grasping two bag groups, such as bag groups 29 and 31 of FIG. 1.

In timed sequence and shortly after the bag groups 29 and 31 are grasped, cam follower 87 drops abruptly off lobe 96 of cam 88 causing rails 71–72 to retract in response to coil spring 83 clearing the bottoms of bag groups 29 and 31 for rotation.

In further timed sequence, start follower 85 encounters lobe 111 of cam 95 actuating micro switch 91 effective to de-energize the magnetic brake and energize the clutch of unit 101 to start rotation of shaft 38, returning the clamp means from the second position (position 94 of FIG. 4) to the first position (position 93 of FIG. 4).

As the bag groups 29–31 assume a horizontal position (see FIG. 4), air valve follower 105 rolls off lobe 107 of cam 108 closing and venting air valve 109 with the result that coil spring 63 returns piston 53 to the right as viewed in FIG. 6, releasing bag groups 29 and 31 upon conveyor belts 98 and 99.

The release of bag groups 29 and 31 is accomplished without interruption of the rotation of the clamp means as it proceeds from the second position to its first position.

Please note that since the helices 18 and 19 rotate constantly at uniform speed during machine operation, they constantly generate a uniform downstream velocity in the bag groups.

Consequently, when bag groups are under the control of the clamp means, such as bag groups 29 and 31 of FIG. 1, it is necessary to impart downstream movement to the shaft 38 (and the shaft 39 when in the second position) at the same velocity as that generated by the helices 18 and 19 to avoid interference and mutilation of bag groups.

This downstream movement is provided by continuously rotating cams 66—66 and mating followers 64—64 which operate in timed sequence to rotate arms 25—25 about their respective pivots 32—32 to move shafts 38 and 39 downstream at a linear velocity equal to the linear velocity generated by the helices 18 and 19.

The shafts 38 and 39 are returned upstream by coil springs 67—67.

Figure 8:
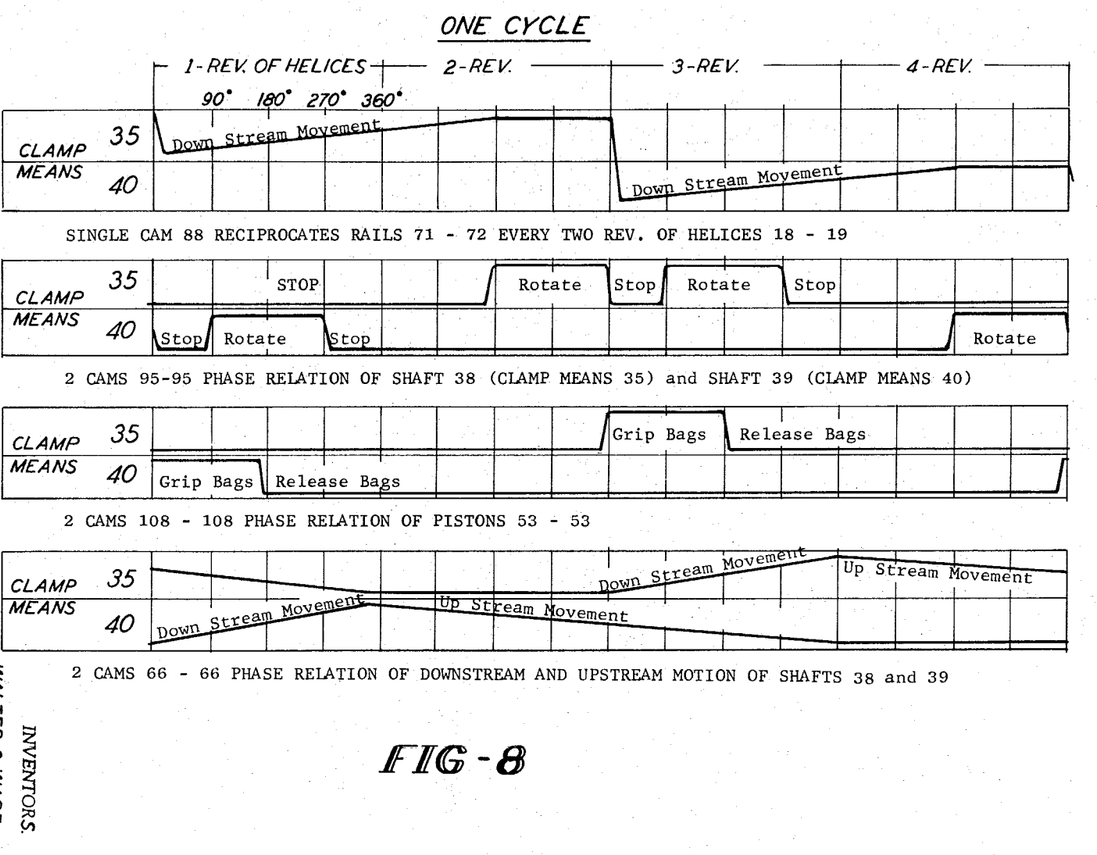
FIG. 8 is a development and schedule of cams which rotate and operate the clamp means.

Referring to the cam chart of FIG. 8, note that the downstream motion of the shafts 38–39 is cyclic and begins just after the bag groups are clamped and the rails 71 and 72 are retracted.

DRIVE

Figure 7:
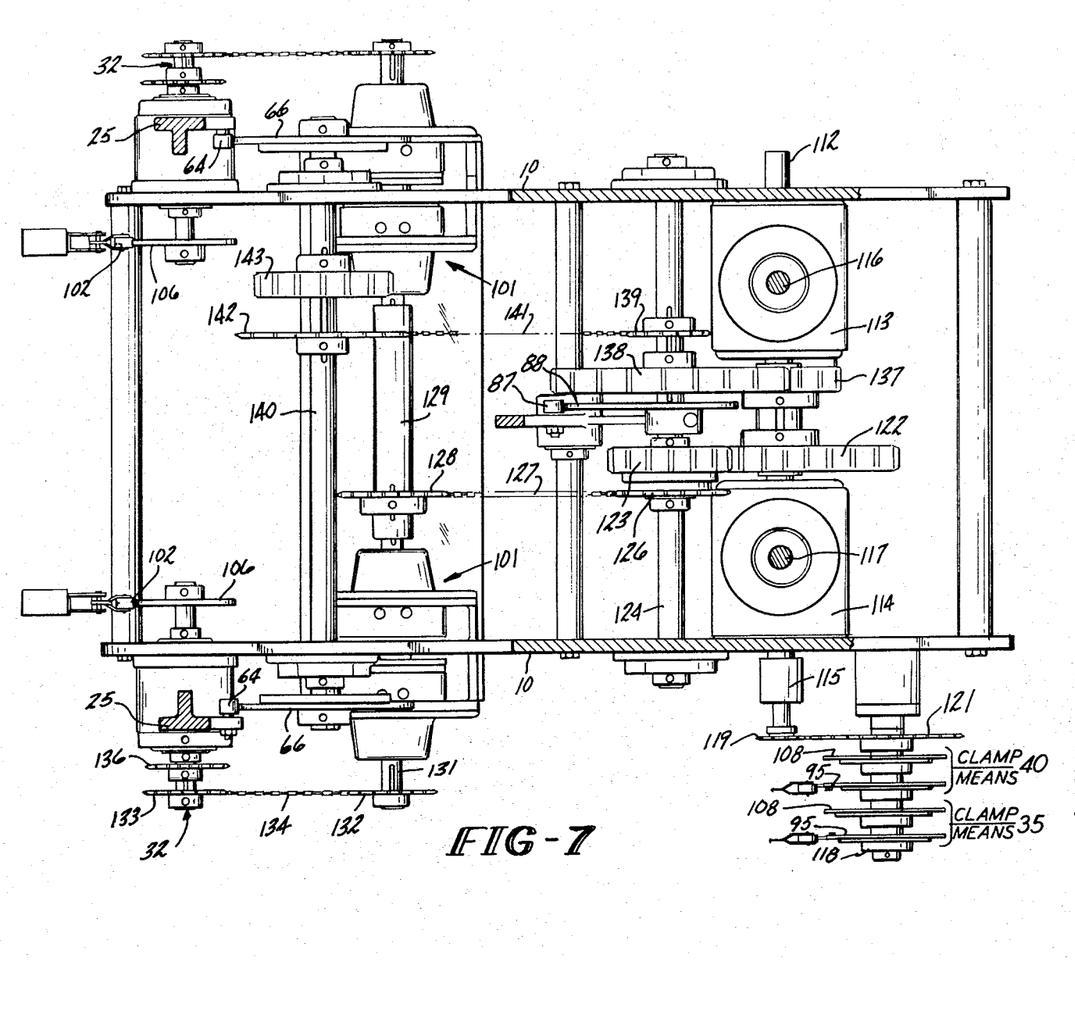
FIG. 7 is a plan view of FIG. 2 as viewed from the plane represented by the line 7—7.

Referring to FIGS. 2, 5 and 7, note that power to the helices 18 and 19 originates with input shaft 112 driving gear boxes 113 and 114 whose vertical output shafts 116 and 117 engage and drive stub shafts 21 and 22 through appropriate bevel gears. As stated previously, the shafts 21 and 22 support and drive their mating helices 18 and 19 continuously.

A power take-off from gear box 114 drives a battery of cams carried by cam shaft 18 through shaft 115, sprockets 119–121 and roller chain (not shown).

The battery of cams is divided into two groups comprising cams 95 and 108 for clamp means 35 and similar cams 95 and 108 for clamp means 40.

A second power take-off from gear box 114 drives the magnetic clutch-brake units 101—101. The power trains run from gear 122 to gear 123 to sprocket 126, roller chain 127 to sprocket 128 and common shaft 129.

Gear 123 and sprocket 126 are keyed together as a unit and run free on shaft 124.

Shaft 129 rotates continuously and powers both magnetic clutch-brake units 101—101. Both units 101 operate in identical fashion except that one unit is associated with clamp means 35 and the other operates clamp means 40. Signals to the units 101 originate with their respective start cams 95 and cooperating stop cam 106.

Since the power train originating with the clutch-brake units are identical, the continuity of only one such train will be described.

Assume that the signal from the cam 106 and its cooperating micro switch 103 calls for braking, output shaft 131 is locked motionless and the clutch side of unit 101 slips. When cam 95 calls for rotation through follower 85 and micro switch 91, the brake of unit 101 is released and the clutch is engaged transmitting power from shaft 129 to output shaft 131 in turn transmitting power to sprockets 132 and 133 via roller chain 134.

Sprocket 136 is thus powered to drive roller chain 56, sprocket 54, and ultimately the appropriate shaft 38 or 39 depending upon which clamp means (35 or 40) is being signalled to rotate.

A power take-off from gear box 13 drives gears 137 and 138. Gear 138 is keyed to shaft 124. Cam 88 is keyed to and driven by shaft 124 thus providing a cam contour for follower 87 which reciprocates arm 78 to bring about the reciprocating motion of rail 71–72 every two revolutions of helices 18 and 19. Sprocket 139 is also keyed to shaft 124 providing power for conveyor belts 98 and 99 through roller chain 141 and sprocket 142 keyed to shaft 140. Through suitable drive means, gear 143 also keyed to shaft 140 powers sheaves 144—144 advancing conveyor belts 98 and 99 continuously.

Shaft 140 also provides power to cams 66—66 providing downstream and upstream motion to shafts 38 and 39 through followers 64—64 and mating movable arms 25—25, completing a cycle every two revolutions of helices 18 and 19.

OPERATION

Assume that the pocketed feed wheel 14 is providing individual bags such as the bags 11, 12 and 13 in continuous fashion from a bag making source (not shown) to the flat plate 17. The continuous operation of the phased, timed helices 18 and 19 will intercept, upon each revolution, a group of bags such as groups 27, 28, 29 and 31.

The helices 18 and 19 advance the bag groups along plate 17; meanwhile at the beginning of the third revolution of the helices, cam 88 operates to provide downstream motion to rails 71 and 72 providing support for bag groups after they advance beyond the end 89 of flat plate 17. In timed sequence and after bag groups 29 and 31 are entirely supported by rails 71 and 72, appropriate cam 95 signals rotation of clamp means 35 from position 93 (see FIG. 3) to position 94 so that the lugs 41 and 44 and lugs 42 and 46 straddle bag groups 29 and 31.

Immediately thereafter in timed sequence, appropriate cam 108 operates air valve 109 moving shaft 55 causing the lugs to clamp bag groups 29 and 31. Immediately subsequent to clamping, rails 71 and 72 are retracted to their dotted line position clearing the bottoms of bag groups 29 and 31.

Thereafter in timed sequence, the second lobe 111 of cam 95 signals rotation of clamp means 35 from the second position (position 94) to the first position (position 93).

During the course of this rotation and when the bag groups 29 and 31 assume a horizontal position, shown being approached in FIG. 4, follower 105 drops off lobe 107 of appropriate cam 108 releasing the clamping action and releasing the bag groups onto slowly moving conveyor belts 98 and 99.

In similar fashion but in opposite hand, clamp means 40 operates in timed sequence to grasp and rotate bag groups 27 and 28 to a horizontal position, releasing them upon conveyor belts 98 and 99.

Figure 10:
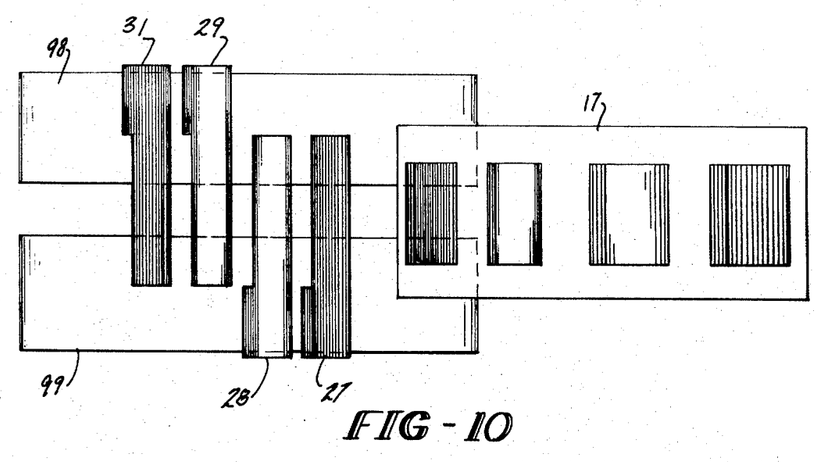
FIGS. 10 and 11 show, schematically, the method of handling the bag groups in the disclosed embodiment of the invention.
Figure 11:
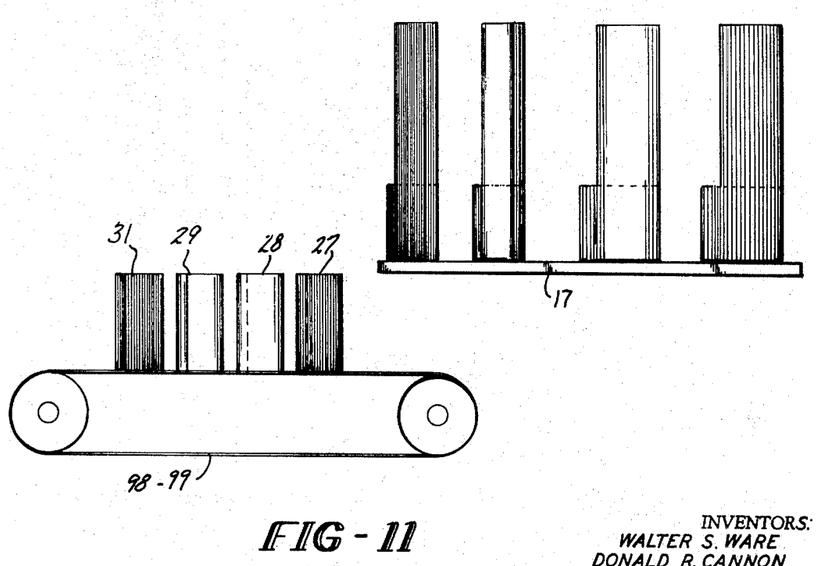

In referring to FIGS. 10 and 11, it is apparent that the butts or bottoms of bag groups 29 and 31 project in one direction while the butts or bottoms of bag groups 27 and 28 project in the opposite direction after deposit upon belts 98 and 99.

ELECTRICAL CIRCUITRY

Figure 9:
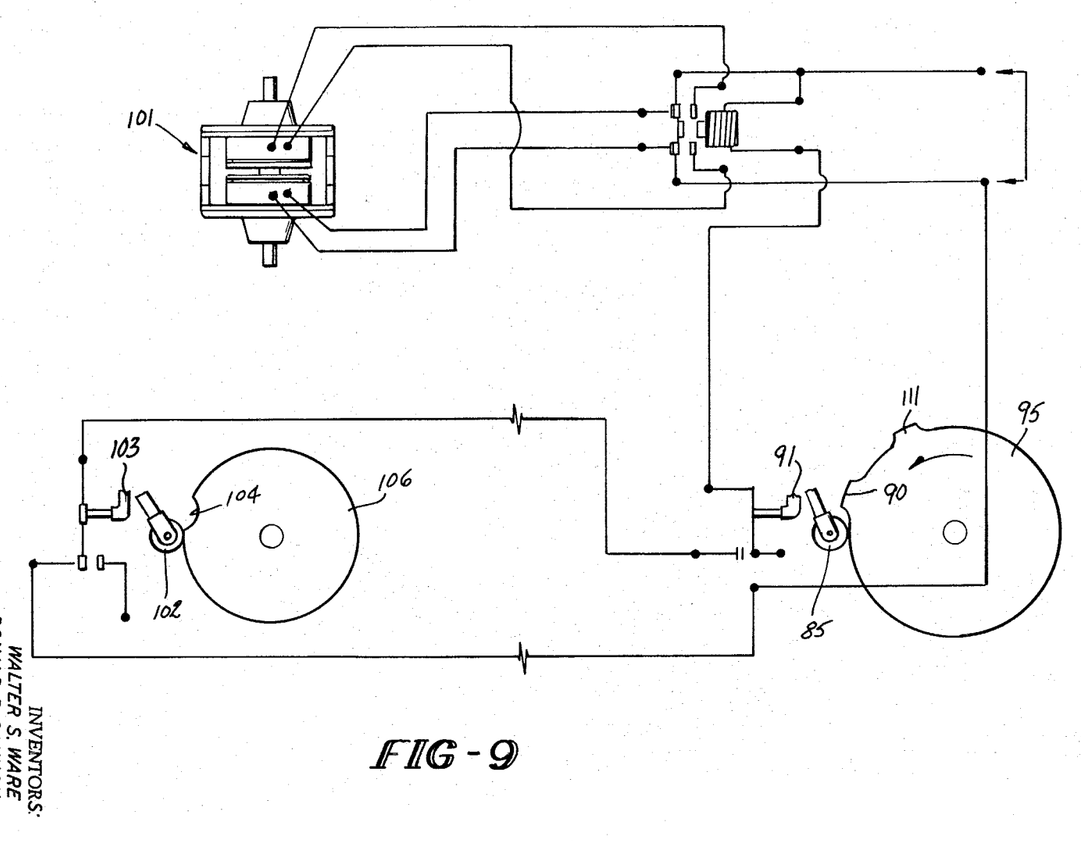
FIG. 9 is a schematic wiring diagram of the electric clutch and brake units.

The schematic of FIG. 9 shows a typical electrical circuit including cams, followers and micro switches for controlling a magnetic clutch-brake unit 101.

As stated previously, there are two such units in the disclosed apparatus but since their operation is identical except for phasing, only one such circuit will be described. Cam 95 rotates continuously and its first lobe 90 operates micro switch 91 to operate the magnetic clutch unit and to release the brake, thereby driving shaft 38 (or 39 as the case may be) from position 93 to position 94. When position 94 is reached, cam 106 operates micro switch 103 to release a clutch of unit 101 and set the brake thereof to hold shaft 38 firmly in the second position.

After the occurrence of clamping and in timed sequence, lobe 111 again actuates micro switch 91 releasing the brake of 101 and engaging the clutch thereof to drive shaft 38 from the second position to the first position.

In timed sequence and in accordance with the signal from its cam 95, shaft 39 is cycled similarly.

What is claimed is:

1. In an apparatus for accumulating and advancing bags comprising a pair of spaced, phased, cooperating helices each having a plurality of turns with a pitch equal to or greater than the thickness of a predetermined number of bags defining a bag group, shaft means for supporting and rotating said helices in unison, means for continuously feeding bags between mating turns of both helices so that as the helices rotate, a bag group is intercepted in periodic fashion, the improvement comprising: clamp means including a supporting shaft projecting into and received within one of said helices, said clamp means being normally in an open position and movable to a closed position, said clamp means being operable to move from a first position in which it is clear of a bag group to a second position in which it straddles said bag group, power means for actuating said clamp means to the closed position when in the second position effective to engage and clamp said bag group, said power means being further operable to rotate said shaft effective to rotate said clamped group of bags to change the attitude or position thereof.

2. The device of claim 1 in which the improvement includes means for moving the clamp means in an axial direction to compensate for the advance of said bag group effected by said helices.

3. The device of claim 1 in which the improvement includes means mounting said supporting shaft eccentrically relative to the axis of the helix within which the supporting shaft is received.

4. The device of claim 1 in which there is a clamp means individual to each helix.

5. The device of claim 1 in which means are provided for moving the clamp means axially of the helices operative only when said bag group is clamped.

6. In an apparatus for accumulating and continuously advancing bags comprising a pair of spaced, phased, cooperating helices each having a plurality of turns with a pitch equal to or greater than the thickness of a predetermined number of bags defining a bag group, shaft means for supporting and rotating said helices in unison, means for continuously feeding bags between mating turns of both helices so that as the helices rotate, a bag group is intercepted in periodic fashion, the improvement comprising: clamp means projecting into and received within one of said helices, said clamp means being operable to engage, clamp and rotate a group of bags effective to change the attitude or position of the bag group.

7. In the method of arranging bags in groups by utilizing a pair of cooperating helices to intercept and advance a predetermined number of bags moving continuously from a source, the improvement comprising the steps of: mechanically grasping a bag group while being advanced by said helices, rotating said bag groups and simultaneously moving said bag groups along a path generally parallel to the axes of said helices to prepare said groups for baling.

8. In the art of collecting or grouping bags in preparation for baling, means for providing finished bags in sequential fashion and for depositing said bags upon a receiving member in a first position, cooperating helices for grouping the bags and for conveying the groups along said receiving member and clamp means cooperating with said helices operative to change the position of said bag groups without interrupting the advance of said bag groups along said receiving member.

References Cited

UNITED STATES PATENTS 3,319,771  5/1967  Nesseth ___________ 198—104

FOREIGN PATENTS 128,773  9/1959  U.S.S.R.
768,504  2/1957  Great Britain.

EDWARD A. SROKA, *Primary Examiner.*

U.S. Cl. X.R.

198—104